Figure 1:
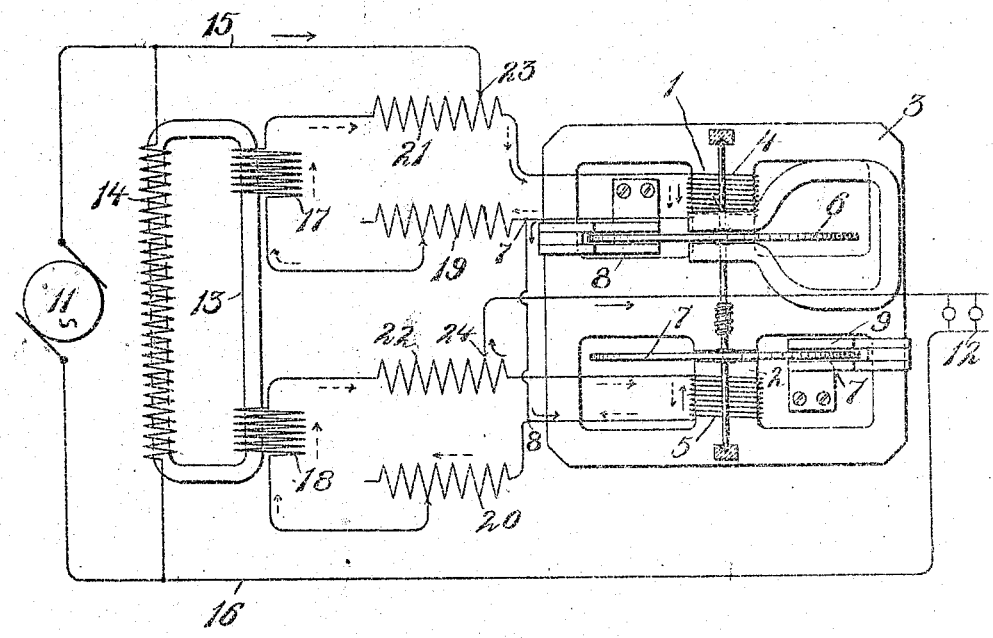

W. STANLEY.
ELECTRIC METER.
APPLICATION FILED MAR. 19, 1906.

941,468.

Patented Nov. 30, 1909.
2 SHEETS—SHEET 1.

Witnesses
Chas. A. Beard
L. Vreeland

Inventor
WILLIAM STANLEY
By his Attorneys
Bartlett, Brownell & Mitchell

W. STANLEY.
ELECTRIC METER.
APPLICATION FILED MAR. 19, 1906.
941,468.
Patented Nov. 30, 1909.
2 SHEETS—SHEET 2.
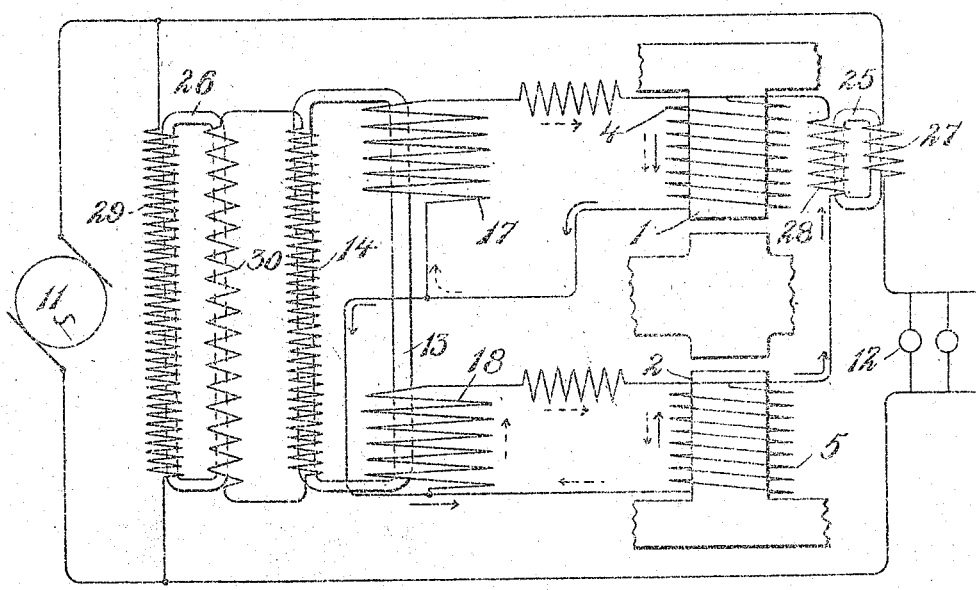

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ELECTRIC METER.

941,468.  Specification of Letters Patent.  Patented Nov. 30, 1909.

Application filed March 19, 1906. Serial No. 306,728.

*To all whom it may concern:*

Be it known that I, WILLIAM STANLEY, a citizen of the United States, residing at Great Barrington, Berkshire county, State of Massachusetts, have invented certain new and useful Improvements in Electric Meters, of which the following is a full, clear, and exact description.

My invention relates to improvements in electric wattmeters and has for its object to produce a new and improved arrangement of energizing circuits suitable for meters such as I have described in my application Serial No. 288,643, filed November 23, 1905. In the type of instrument there described a resultant torque proportional to the energy in the circuit is produced by the differential action of two motor devices. The torque of each individual motor is proportional to the square of the flux energizing the motor, and this flux is proportional to the vector sum of the currents representing the electromotive force and the current in the circuit to be measured.

In the meter of the application above referred to, the field magnet structure of each motor is wound with a winding connected in shunt to the mains, and is also wound with a second separate winding connected in series to the external or work circuit. The dimensions of these windings are proportioned in ways well understood in the art. In order that the invention may be carried out completely and the resultant flux in each motor be equal to the vector sum or difference of the electromotive force and current to be measured, it is necessary that when the power factor of the external circuit is unity, the current flowing in the circuit connected thereto shall be in phase with the current flowing in the shunt circuit, and in the application referred to, various means are described for accomplishing this result.

The present invention has for its object to provide a very simple means for obtaining similar results without the use of two energizing field magnet coils, and to provide means for adjusting the phase of the current to be delivered to the work circuit through the meter, so as to be in phase with the current representing the electromotive force on the circuit to be measured, when the power factor of the external circuit is unity, without the aid or influence of any other phase influencing device than that furnished by the circuits themselves, by which I mean that the circuit connections employed necessarily produce the desired phase coincidence without employing any special adjusting devices for obtaining such result.

For the purpose of simplicity, I have shown the device in connection with an apparatus in which an independent armature member is provided for each motor, as distinguished from a device in which two motive devices have a single disk on which the two field magnets act. It will, however, be obvious, that the circuit arrangement can be used in connection with either a single or a double disk type.

The following is a description of my invention, reference being had to the accompanying drawings, in which—

Figure 2:
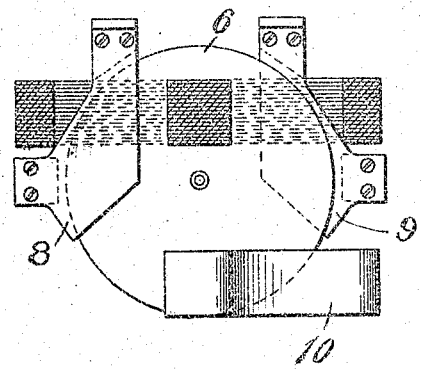

Figure 1 shows an apparatus with circuits embodying my invention. Fig. 2 is a plan view, partly in section, of the apparatus. Fig. 3 is a modified diagram of the circuits embodying my invention.

Referring more particularly to the drawings, 1 and 2 are the poles of two torque-producing devices, which, for convenience, are shown as formed on a single stamping 3.

4—5 are two windings upon the poles 1—2 respectively. 6—7 are two disks of aluminum or other conducting material which lie in the respective fields of said poles 1 and 2.

8 9 are two attracting armatures of iron situated on opposite sides of their respective poles 1 and 2 and embracing the disks 6 and 7. 10 is a brake magnet which embraces one of said disks.

The structure thus far described, except for the fact that the windings 4 5 are single windings as distinguished from double windings, is the same as that described in my application above referred to, and is chosen in contradistinction to a form in which the two torque-producing devices act upon the same conducting disk for the purpose of simplicity in illustration and explanation. As set out in my said application, when alternating currents are sent through the windings 4—5, currents are induced in the disks 6 and 7 which set up magnetic fields in the region of the armatures 8 and 9. These fields, reacting upon the eddy currents which produce them, produce upon the moving structure opposing torques, each of which varies with the square of the energizing current, and also of the flux which it produces. So long as the currents flowing through the coils 4 and 5 are equal in value, the two torques are equal and opposite, and no movement of the rotatable system results. If, for any reason, one energizing current becomes greater than the other, the torques become unbalanced and the movable system rotates. If the flux produced by the coil 4 is proportional to the (vector) sum of currents corresponding to the electromotive force and the current to be measured, and the flux produced by the coil 5 is proportional to the (vector) difference of current corresponding to the electromotive force and current to be measured, the resultant torque is proportional to both the electromotive force and the current to be measured, times the cosine of the angle of phase difference between them, and the device becomes a true wattmeter, that is, measures the energy of the current passing to the translating devices.

As shown in Fig. 1, in order to cause the current in the coil 4 to be proportional to the vector sum of currents proportional to the electromotive force and the current to be measured, and the currents in the coil 5 to be proportional to the vector difference of currents corresponding to the electromotive force and current to be measured, I place the two coils 4 and 5 in series with a source of alternating current 11, and the translating devices 12, and place across the mains a transformer 13 constructed in the ordinary way and having a single primary and two secondary windings. The primary 14 is connected between the mains 15 and 16, and the secondaries 17 and 18 are connected respectively around the coils 4 and 5. The transformer secondary 17 is so connected to the coil 4 as to tend to send a current through that coil in the same direction as the current which flows from the generator 11 through that coil to the translating device 12.

The transformer secondary 18 is connected to the coil 5 so as to tend to send a current through that coil in the opposite direction to the current flowing from the source 11 through that coil to the translating device 12. The currents due to the transformer secondaries 17 and 18 are equal and are proportional to the electromotive force. The current flowing through the coils 4 and 5 from the generator 11 to the translating devices 12 is proportional to the current supplied from the generator to those translating devices. Calling the currents which are proportional to the electromotive force $a$ and the currents which are proportional to the currents supplied to the translating devices 12, $b$, it will be seen that the current flowing through the coil 4 will be equal to the (vector) sum of the currents proportional to the electromotive force and current to be measured, that is, equal to $a+b$, and the current flowing through the coil 5 will be proportional to the (vector) difference of the electromotive force and current to be measured, that is, $a-b$. The flux due to the coil 4 will also be proportional to the (vector) sum of $a+b$, and the flux due to the coil 5 will be proportional to the (vector) difference $a-b$. The two torques produced will be proportional respectively to the squares of the (vector) sum $a+b$ and the (vector) difference $a-b$, and since the two torques oppose one another, the resultant torque tending to move the rotating system will be proportional to the electromotive force and current to be measured and the cosine of the angle of lag between them, that is, will be proportional to $a\ b\ \cos.\ \theta$, where $\theta$ represents the angle of lag. The foregoing is on the assumption that the circuit formed by the secondary 17 and the coil 4 has similar electrical constants to the circuit formed by the secondary 18 and the coil 5. When this is the case, the coils 17 and 18 being similar to each other, and the coils 4 and 5 being similar to each other, the currents flowing through the coils 4 and 5 when no current is flowing through the translating devices 12 will be equal and produce fields and torques of similar value, but of opposite direction, and will not cause any resultant motion to take place. This balance of torques represents the no load condition of the meter. The paths of the currents flowing under these conditions are indicated by dotted arrows. When currents are supplied to the translating devices, a current flowing from the generator 11 through the main 15 will pass through the magnetizing winding 4 in the direction of the solid arrows, and in the same direction as the current from the coil 17, represented by the dotted arrow. Thence it will flow through the coil 5 in the direction indicated by the solid arrow, being in the opposite direction to the current from the coil 18, indicated by the dotted arrow. Thus it will be seen that the source or line current will flow through the magnetizing windings 4 and 5 in opposite directions, while the secondary currents induced in the secondaries 17 and 18 will flow through said windings in the same direction, and consequently the resultant current, composed of a secondary and the main current will flow in each magnet, producing magnetizations proportional to the (vector) sum and the (vector) difference of such components.

When the current flowing to the translating devices 12 is of unity power factor, the currents flowing to the translating devices 12 and the secondary currents flowing from the secondaries 17 and 18 will coincide in phase, since the electromotive force induced upon the secondary 17 is in opposite phase to, that is, 180° from, the electromotive force at the terminals of the primary 14, and therefore is in phase with the electromotive force applied to the coil 4 from the mains when the power factor of the external circuit is unity. Now, the current flowing through the circuit including the secondary coil 17 and the coil 4, and the current flowing through the circuit including the secondary coil 18 and the coil 5, (said circuits being indicated by dotted arrows), will lag behind the secondary electromotive forces by an amount depending upon the ratio of the resistance to the inductance of their respective circuits. The current flowing to the translating devices 12 from the generator 11 will divide, part flowing through the coil 4 and part through the coil 17, at times, dependent upon the time constants of these two parallel circuits, and as the time constants of these circuits are common to both the secondary and line currents the component of the line current which flows through the coil 4 will flow in phase with the secondary current, provided the power factor of the external circuit is unity. In a similar way it can be shown that the component of the line current which flows through the coil 5 will be exactly opposite in phase to the secondary current in the circuit made up of the secondary 18 and the coil 5, under the conditions given.

In order that the value of the two secondary currents furnished by the transformer coils 17 and 18 may be exactly the same, resistances 19—20 are introduced into these circuits, by the adjustment of either of which equality of currents can be produced. In order that the line currents may divide in exactly the same ratio in passing through the coils 4 and 17 and the coils 5 and 18, constituting two sets of parallel circuits, resistances 21—22 are provided, together with adjustable contacts 23—24, by which the points of intake of the main line currents can be varied. By these means I am able to first adjust the value of the current from each secondary so that they shall be exactly equal when no line current is flowing, and second, I may adjust the line current so that it will have exactly equal values in the coils 4 and 5 for any given value of current delivered to the external circuit. Under these conditions therefore the meter is in balanced condition, and the resultant magnetizations of the two windings 4 and 5 are exactly proportional to the vector sum and difference of similar components.

Fig. 3 illustrates an arrangement where a transformer 25 is employed to introduce into the meter circuits currents proportional to the main line current of the circuit to which the instrument is connected. A second transformer 26 is used to supply to the primary of the transformer 13 of Fig. 1 currents proportional to the electromotive force of the circuit to which the instrument is connected. The transformer 25 has its primary circuit 27 connected in the main line and its secondary 28 connected in series with the energizing coils of the meter, the connections being similar to the generator connections in Fig. 1. This results in causing a current proportional to the current in the main line to flow through the two magnetizing windings of the motor, as shown by the full arrows (Fig. 3). The transformer 26 has its primary 29 connected between the mains of the generator, whose potential is to be measured, while its secondary 30 is connected in series with the primary 14 of the small potential transformer 13 belonging to the meter proper. By this means, in the well-known manner, the potential of the system can be reduced before it reaches the secondary transformer. The relative directions of the currents caused by the shunt and series transformers are the same as described in connection with Fig. 1, and cause the resultant magneto-motive force proportional to $a+b$ in the coil of one motive device, and to $a-b$ in the other, where $a$ and $b$ represent currents proportional to the electro-motive force and current to be measured. The elements in Fig. 3 are numbered to correspond to those in Fig. 1.

My invention permits of various modifications, and adaptations, and can be embodied in various forms. The form I have shown and described, however, is the one which is preferred by me.

What I claim is:

1. In an alternating current watt-meter, the combination of two torque producing devices producing opposing torques, each having a single energizing winding in series with a source of current proportional to the current to be measured and shunted by a source of current proportional to the electromotive force to be measured.

2. In an alternating current watt-meter, the combination of two torque producing devices producing opposing torques, each having a single energizing winding in series with a source of current proportional to the current to be measured and shunted by a transformer secondary to whose primary is applied an electromotive force proportional to the electromotive force to be measured.

3. In an alternating current watt-meter, the combination of two torque producing devices producing opposing torques, each having a single energizing winding in series with a source of current proportional to the current to be measured and shunted by a source of current proportional to the electromotive force to be measured, and resistances in one of said shunts.

4. In an alternating current watt-meter, the combination of two torque producing devices producing opposing torques, each having a single energizing winding in series with a source of current proportional to the current to be measured and shunted by a source of current proportional to the electromotive force to be measured, the circuits formed by the windings and their respective shunts having equal time constants.

5. In an alternating current watt-meter, the combination of two torque producing devices producing opposing torques, each having a single energizing winding in series with a source of current proportional to the current to be measured and shunted by a source of current proportional to the electromotive force to be measured, and means for equalizing the time constants of the circuits formed by the windings and their respective shunts.

6. In an alternating current watt-meter, the combination of two torque producing devices producing opposing torques, each having a single energizing winding in series with a source of current proportional to the current to be measured and shunted by a source of current proportional to the electromotive force to be measured, and means for equalizing the components of the currents to be measured which pass through the several energizing windings.

WILLIAM STANLEY.

Witnesses:
G. FACCIOT,
H. M. SMITH.